United States Patent
Billy et al.

(10) Patent No.: US 6,549,358 B1
(45) Date of Patent: Apr. 15, 2003

(54) EHANCED GRIPPER FOR TRANSPORTING CARTRIDGES IN AN INFORMATION STORAGE LIBRARY

(75) Inventors: Melvin Billy, Tucson, AZ (US); Steven Lloyd Felde, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,351

(22) Filed: Apr. 28, 2000

(51) Int. Cl.[7] .................................. G11B 15/18
(52) U.S. Cl. .................. 360/69; 360/92; 360/98.04
(58) Field of Search ..................... 360/69, 92, 93, 360/98.04, 98.08; 369/36.01

(56) References Cited

U.S. PATENT DOCUMENTS

| | | | | |
|---|---|---|---|---|
| 5,065,265 A | * | 11/1991 | Pierrat | 360/92 |
| 5,687,039 A | * | 11/1997 | Coffin et al. | 360/92 |
| 5,746,464 A | * | 5/1998 | Paul | 294/116 |
| 5,926,341 A | * | 7/1999 | Mueller et al. | 360/92 |
| 6,028,733 A | * | 2/2000 | Schmidtke et al. | 360/92 |
| 6,421,306 B1 | * | 7/2002 | Luffel et al. | 369/36.01 |

* cited by examiner

Primary Examiner—David Hudspeth
Assistant Examiner—Fred F. Tzeng
(74) Attorney, Agent, or Firm—John H. Holcombe (57) ABSTRACT

A gripper for clutching cartridges for transport in a computer information storage library. The library includes storage locations for the data cartridges, a transporter with the gripper for moving the cartridges between the storage locations and a read/write cartridge drive. The gripper provides a positive grip on the end of the cartridge by providing a positive retention finger to hook into the centrally located lip provided on the bottom of the cartridge and at least one opposing finger to contact the top of the cartridge to balance the mechanical forces between the positive retention finger and the opposing finger.

35 Claims, 5 Drawing Sheets

EHANCED GRIPPER FOR TRANSPORTING CARTRIDGES IN AN INFORMATION STORAGE LIBRARY

FIELD OF THE INVENTION

This invention relates generally to an information storage library and more specifically to a robotic picker for data cartridges having a positive gripper for holding the cartridges.

BACKGROUND OF THE INVENTION

An information storage library for a data processing system typically includes at least a media storage system for computer information data cartridges, a drive mechanism for placing the data onto the cartridges and removing the data from the cartridges, a picker also called a gripper or engagement mechanism for inserting cartridges into the drives or the storage locations or for extracting the cartridges from the drives or storage locations, and a transport mechanism for moving the picker and the cartridge between the drives and the storage locations. Computer information storage libraries include a removable media which, for example, could be disk cartridges, either magnetic or optical, and magnetic tape cartridges. Media storage systems include, for example, carousels, cylindrical silos, and slotted magazines or racks. A wide variety of pickers are included in the storage library systems. For example, frictional grippers with multiple fingers may be used or the cartridges may be simply pushed or pulled. In general, for any robotic picker, it is desirable to reduce complexity, weight and number of parts. In particular, it is desirable to reduce the number of electrically active devices to eliminate potential sources for malfunction and to eliminate problems associated with moving electrical connections. Typically the present day picker includes a grip mechanism which holds the cartridges through friction.

An example of such a mechanism is shown in the IBM Technical Disclosure Bulletin of August 1993 at pages 265–268 and titled "Automated Cartridge Tape Library Grip Mechanism". The gripper in the mechanism of the Technical Disclosure Bulletin is opened by activating a solenoid. The gripper grasps cartridges by means of a stationary finger and a pivoting thumb. The thumb is forced closed by grip springs. The thumb is pivoted open by energizing the solenoid. The solenoid is activated to place the gripper mechanism adjacent to the cartridge and then the solenoid is deactivated to grip the cartridge through friction applied through the springs. The grip springs cause the thumb to pivot closed thereby causing the cartridge to be squeezed between the thumb and finger. The problem with a frictional gripping mechanism is that the cartridge could be dislodged from the picker by contact with another mechanism or by an overactive cartridge holding mechanism in the storage system or drive mechanism.

It is, therefore, an object of the present invention to provide a picker mechanism that includes a gripper for positively gripping the cartridge.

Another picker for data cartridges is described in U.S. Pat. No. 5,687,039 issued on Nov. 11, 1997 to Paul Coffin, et al and assigned to the Hewlett-Packard company. This patent provides a dual fixed finger picker for gripping the cartridges. The fingers are fixed with regard to the picker and the picker must move vertically down to first allow the fingers to pass under the cartridge before engagement and then the picker must move vertically upward to engage the fingers with the cartridge. The picker can then draw the cartridge in and move to the next cartridge location. The picker can disengage the fingers from the cartridge with the similar combination of motions. The picker of this patent does not have a positive finger to provide a positive grip on the cartridge and relies mainly upon gravity to hold the cartridge on the fingers as the cartridge is drawn from the storage location or the drive.

Another object of the present invention, therefore, is to provide a positive gripper mechanism on a robotic picker that positively holds the cartridge without involved motions of the picker with regard to the cartridge.

There is an ongoing need for improved grippers for the pickers for computer information cartridges that provides a positive grip to hold the cartridge during transport between the storage area and the drives.

SUMMARY OF THE INVENTION

In view of the foregoing, it is an object of the present invention to provide a picker assembly having an enhanced gripping mechanism for holding cartridges while transporting the cartridges between the storage area and the drive mechanism of a computer library system.

It is another object to provide a gripper mechanism that positively hooks into the cartridge.

It is a further object of the invention to provide a gripper that positively interacts with the end of the cartridge while including balancing fingers to prevent the cartridge from disengaging with the gripper mechanism.

It is a further object of the present invention to provide a gripper that does not solely depend upon a frictional grip to hold a cartridge for transport in the library system.

These and other objects are achieved in this invention by providing an automated storage library having a media storage system for a plurality of data cartridges, at least one drive mechanism, a transport mechanism for moving the cartridges between the drives and the storage areas, the transport mechanism including a positive picker or gripper mechanism that includes a hooking finger for interacting with an end of the cartridge through a positive retention finger to hook into a centrally located lip provided on the bottom of the cartridge and at least one opposing finger to contact the top of the cartridge to balance the mechanical forces between the positive retention finger and the opposing finger. A solenoid may be used to open the fingers for locating the gripper adjacent to the cartridge, as shown in one embodiment. When the solenoid is deactivated, springs place the positive retention finger positively hooking into the lip of the cartridge and further springs positively bring the opposing fingers to contact the top of the cartridge to firmly grip the cartridge.

In a second embodiment, the transport mechanism includes a casing that surrounds the cartridge during transporting. At least the positive retention bearing spring is loaded open when the gripper mechanism is positioned to accept or release the cartridge located and closed to hook into the centrally located lip as the gripper mechanism loads the cartridge into the casing.

The foregoing and other features and advantages of the invention will be apparent from the following more particular description of the preferred embodiment of the invention, as illustrated in the accompanying drawings.

DETAILED DESCRIPTION OF THE INVENTION

Referring to the illustrations, like numerals correspond to like parts depicted in the figures. The invention will be described as embodied in an automated magnetic tape library storage subsystem for use in a data processing environment. Although the invention shown uses magnetic tape cartridges, one skilled in the art will recognize that the invention equally applies to optical disk cartridges or other removable storage media. Furthermore, the description of an automated magnetic tape storage system is not meant to limit the invention to data processing applications as the invention herein can be applied to magnetic storage and cassette handling systems in general.

Figure 1A:
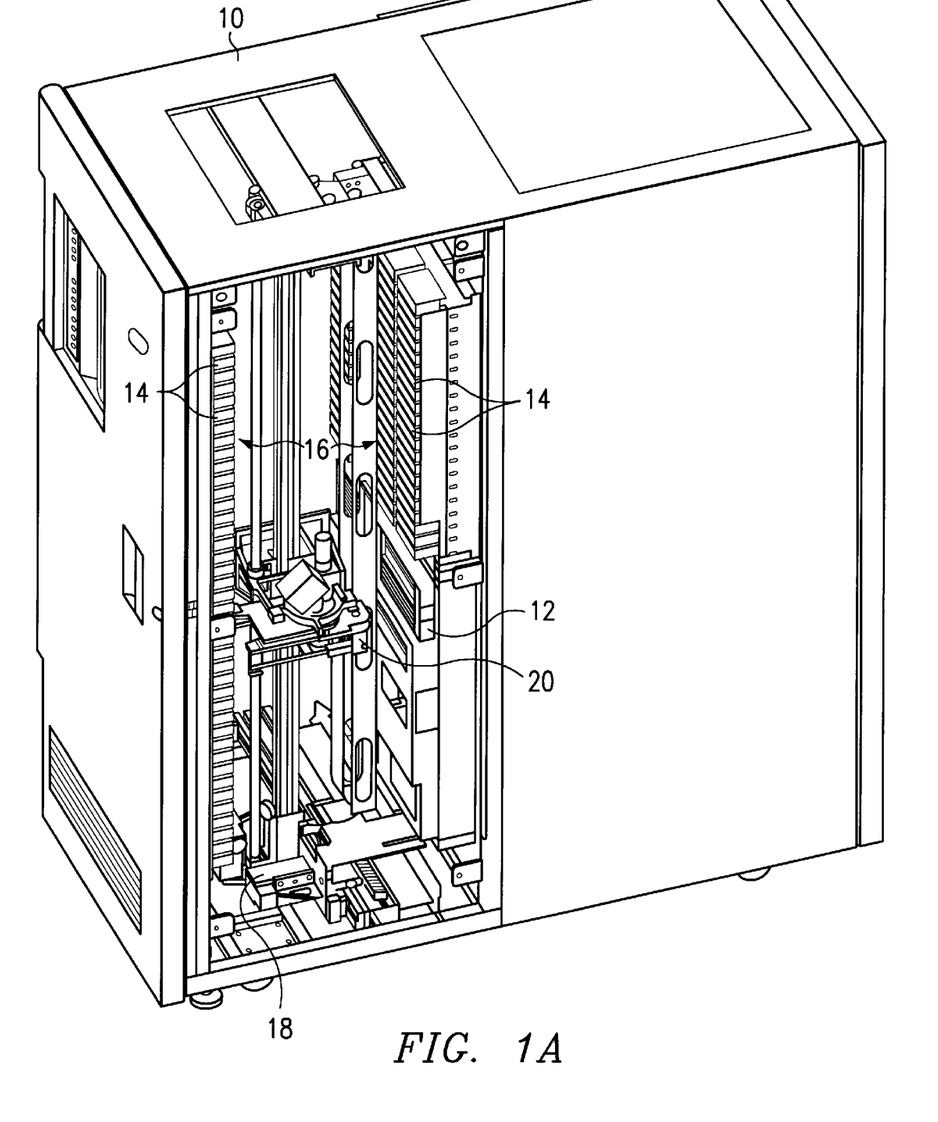
FIGS. 1A and 1B are perspective views of an automated storage and retrieval data processing library employing an embodiment of the cartridge holding mechanism of the present invention.
Figure 1B:
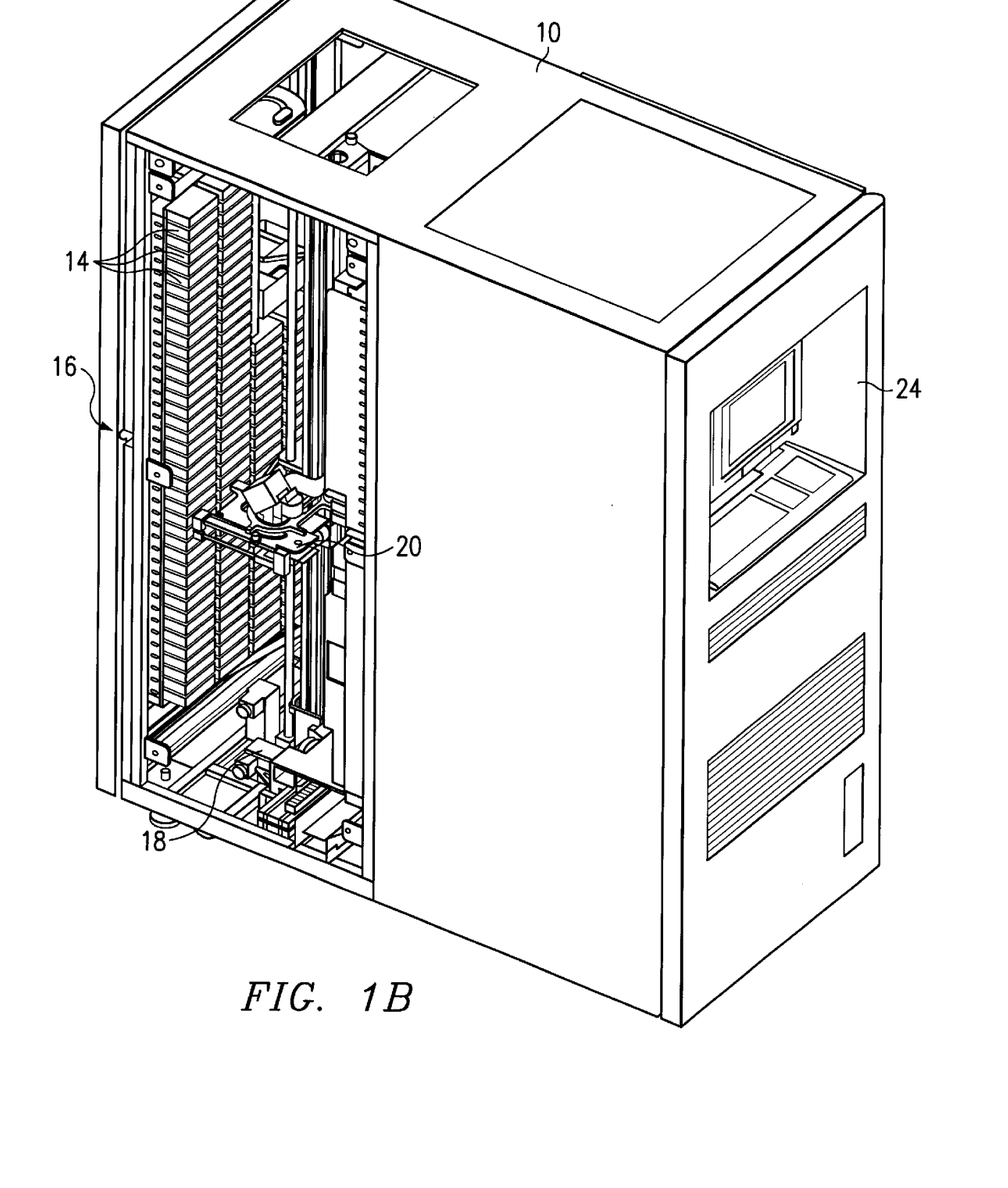

FIGS. 1A and 1B are views of an automated information storage and retrieval library 10 employing one embodiment of a picker mechanism which can include the present invention. The library 10 includes one or more data recorder modules or drives 12, a plurality of cartridges 14 stored in a bank of cells 16 forming a storage module, an accessor 18 for transporting a selected cartridge 14 between a storage cell 16 and a drive 12. The accessor 18 includes the picker mechanism with a cartridge gripper 20 of the first embodiment design. The second embodiment design of a picker mechanism will be discussed later. The drives 12 can be optical disk drives or magnetic tape drives and the cartridges can contain optical or magnetic media, respectively. The library 10 also includes a library data directory or controller 24 that interconnected with, and controls the action of, the drives 12 and the accessor 18. The controller 24 which includes at least one computing processor is further interconnected with a host processor (not shown) from which it receives access commands. Information to be recorded on, or to be read from, selected cartridges 14 is transmitted between the drives 12 and the host 26 through the library controller 24 or directly between the drives 12 and the host.

Figure 2:
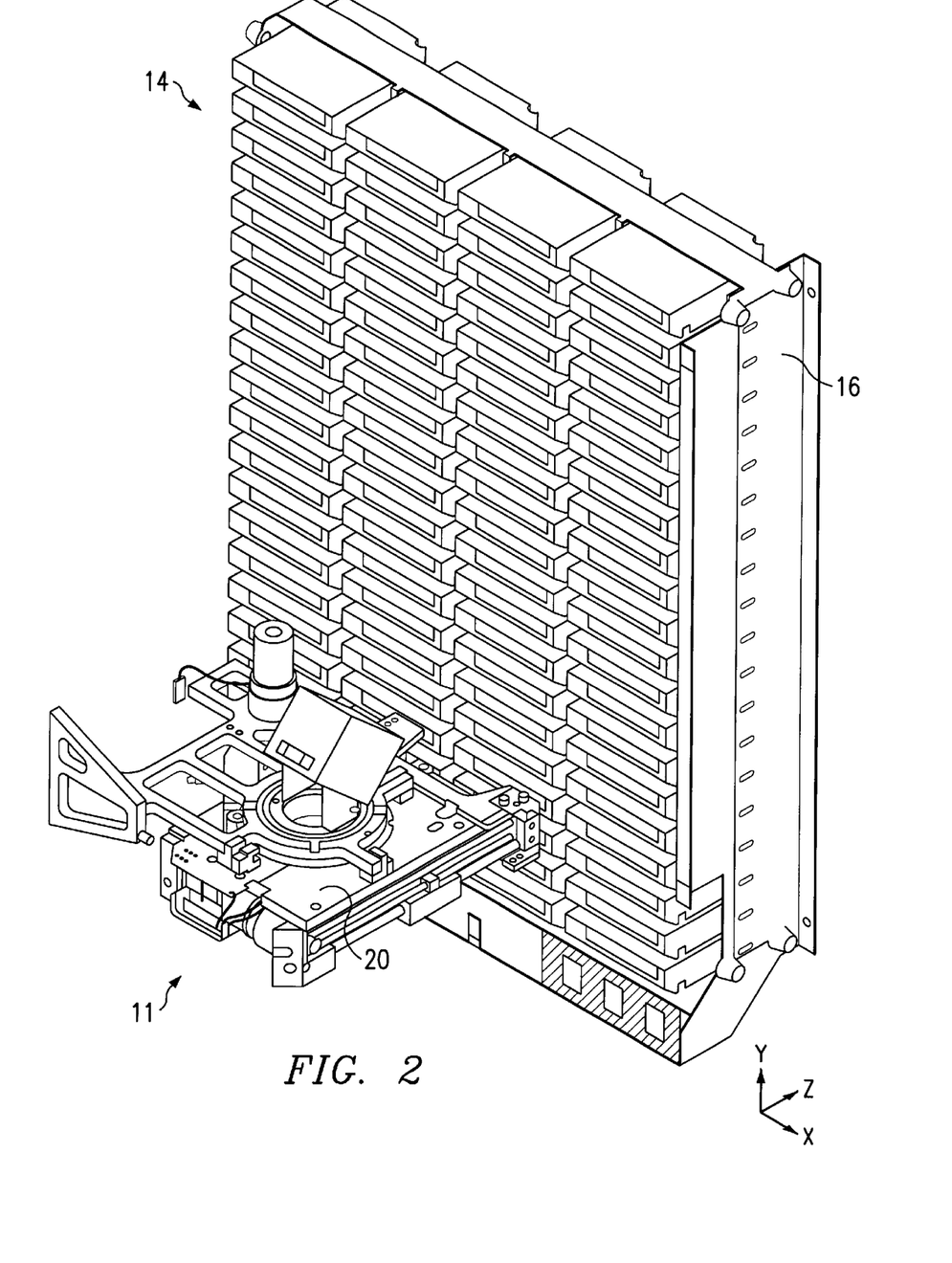
FIG. 2 is a perspective illustration of a gripper in proximity to a bank of storage cells of the library.

FIG. 2 is an illustration of the picker mechanism 11 in front of the bank of storage cells 16. The library 10 may have many such banks of cells and each bank may have any number of cells. The arrangement of the cells 16 shown in FIG. 2 is for illustrative purposes only and it is not necessary for the present invention that the bank of cells have a particular configuration, or even that the cells be grouped into defined banks. A more detailed drawing of the picker mechanism 11, including the cartridge gripper 20 is shown in FIGS. 3A and 3B.

Figure 3A:
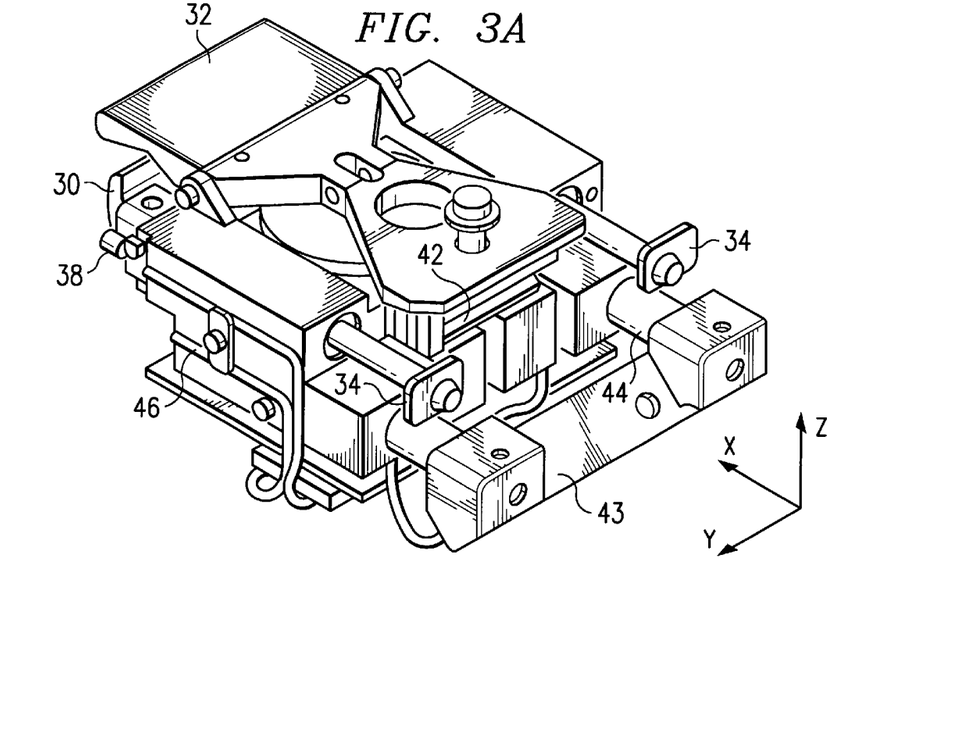
FIG. 3 is a perspective view of a prior art gripper mechanism which includes the positive retention design of the present invention.

Referring now to FIG. 3A, the accessor 18 moves the picker mechanism 11 forward in the direction such that the cartridge gripper 20 which includes a positive retention finger 30 shaped like a hook and an opposing finger 32 move on opposite sides, i.e., the top and bottom, of the target cartridge. The picker mechanism 11 selects one cartridge from the plurality of cartridges 14 as shown in FIG. 2. The front end of an eject bar 34 contact the rear end of the target cartridge. This forces the eject bar pads to move away from a cartridge presence sensor thereby notifying the grip controller (not shown) that the cartridge gripper 20 is aligned properly with the cartridge 14. The picker mechanism 11 continues to move forward until the eject bar contacts the front of the cartridge gripper 20, thereby triggering a reach complete sensor 38.

The reach complete sensor 38 signals the grip controller that the cartridge 14 is fully seated in the cartridge gripper 20. The grip controller then stops the forward motion of the cartridge gripper 20 and thereby to de-energize a solenoid 40.

Figure 3B:
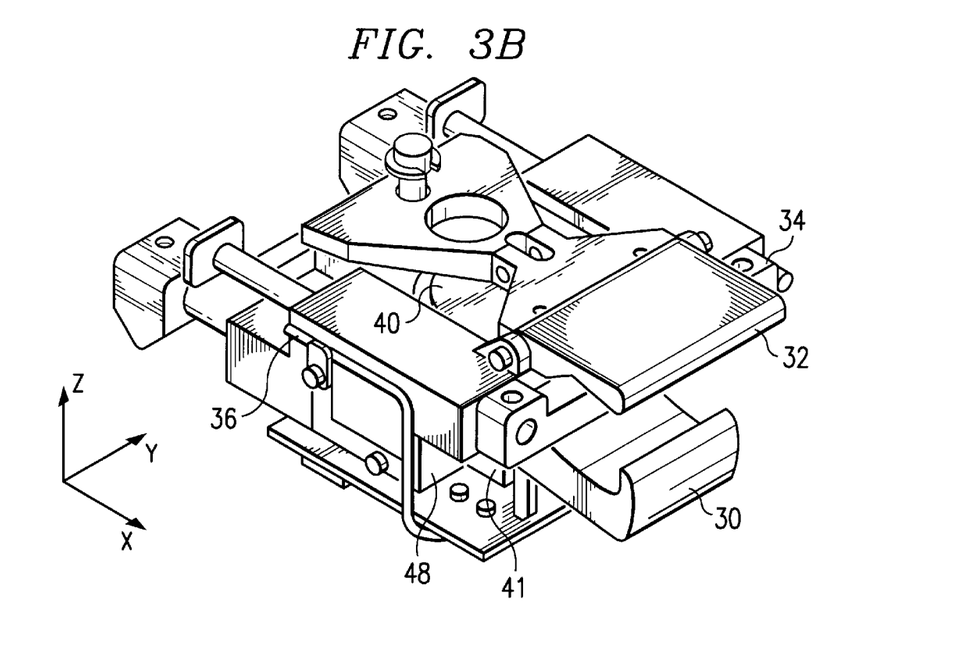

Still referring to FIGS. 3A and 3B, the cartridge gripper 20 grasps the cartridges 14 by means of the positive retention finger 30 in the shape of a hook and the pivoting opposing finger 32. Both the positive retention finger 30 and the opposing finger 32 are forced closed by grip springs (not shown). The positive retention finger 30 and the opposing finger 32 are pivoted open by energizing the solenoid 40. The positive retention finger 30 and the opposing finger 32 are as thin as material strength will allow to permit insertion between the closely spaced cartridges in the library storage cells 16. The positive retention finger 30 has a hook to engage a cavity and lip of the cartridge 14 as will be described later in FIG. 5. The opposing finger 32 contacts the top of the cartridge to capture the cartridge 14 between the opposing finger 32 and the positive retention finger 30.

The picker mechanism 11 employs an eject bar which translates in the X direction guided by linear bearings and is biased in the X direction by eject springs (not shown). The eject bar 34 serves three purposes. First a cartridge present sensor 36 senses the forward end of travel of the eject bar 34 and notifies the gripper controller that a cartridge is present. A reach complete sensor 38 senses the rear position of the eject bar 34 and notifies the gripper controller that the cartridge 14 is fully seated in the cartridge gripper 20 and deactivates the solenoid 40 to close the gripper by moving the positive retention finger 30 and the opposing finger 32 in the Z direction towards each other. After the picker mechanism 11 arrives at its destination with a cartridge, the solenoid 40 is activated thereby compressing the springs and removes the positive finger 30 and the opposing finger from contact with the cartridge. The spring loaded eject bar 34 then ejects the cartridge from the cartridge gripper 20. A sensor flag 42 senses that the fingers are open. The sensor flag 42 confirms to the grip controller that the fingers are open and rotated fully in the THETA Y direction. The cartridge gripper then proceeds to move the gripper mechanism forward in the X direction over the cartridge.

The picker mechanism 11 is supported by two parallel shafts extending from the accessor 18. The picker mechanism 11 rides on linear bearings and is permitted to translate in the X direction on the shafts. The picker mechanism 11 is biased in the positive X direction by two compliant springs 44. The compliant springs 44 causes the cartridge gripper to be held against seats on the cartridge gripper body and against a compliance sensor 46. The compliance sensor 46 senses the gap between the top and the cartridge grip body to notify the grip controller that the picker mechanism 11 has stepped forward in the positive X motion.

The solenoid front 40 is fixed to a mount that permits the solenoid and the mount to rotate in the THETA Y direction on pins and bushings held in journals on the picker mechanism 11 body. The purpose of this is to permit the solenoid 40 to conform to the rotational motion of the fingers 30 and 32 which are attached to the plunger of the solenoid 40.

In order to have the picker mechanism 11 select a cartridge 14, the library accessor 18 receives a command from the library controller. The accessor 18 moves the picker mechanism 11 in close proximity to the target cartridge. The solenoid is then energized causing the positive retention finger 30 and the opposing finger 32 to rotate open. The sensor flag 42 confirms that the fingers are open. The accessor 18 then moves the picker mechanism 11 forward in the positive X direction such that the positive retention finger 30 and the opposing finger 32 move on opposite sides of the target cartridge with a positive retention finger 30 facing the bottom of the cartridge. A front end of the eject bar 34 contacts the rear end of the target cartridge. This forces the eject bar stop to move away from the cartridge present sensor 36 thereby notifying the grip controller that the cartridge gripper 20 is aligned properly with the cartridge. The cartridge gripper 20 continues to move forward until the eject bar 34 contacts the front of the picker mechanism 11 body to trigger the reach complete sensor 38.

The reach complete sensor 38 signals the controller that the cartridge is fully seated in the cartridge gripper 20. The controller stops the forward motion of the picker mechanism 11 and de-energizes the solenoid 40. The grip springs cause the positive retention finger and the opposing fingers to pivot closed causing the cartridge to be squeezed between the fingers. The accessor 18 reverses motion in the negative X direction, thereby extracting the cartridge from its storage cell.

The picker mechanism 11 ejects a cartridge to place it into its storage cell 16 or into the drive 12 by having the accessor 18 move the picker mechanism 11 and the cartridge it is carrying near the loader of a tape drive unit 12 such that the remaining motion is only in a forward positive X direction. The accessor 18 moves the picker mechanism 11 and the cartridge forward such that the cartridge begins to move into a tape drive 12. The controller then energizes the solenoid causing the positive retention finger 30 and the opposing finger 32 to pivot open (in the negative THETA Y rotation). The eject springs push the eject bar 34 forward thereby ejecting the cartridge from the cartridge gripper. The cartridge presence sensor 36 changes state, signaling the controller that the cartridge is free of the fingers 30 and 32. The cartridge gripper 20 is then moved in a negative x direction to remove the picker mechanism 11 from contact with the cartridge and the tape drive unit. The controller then de-energizes the solenoid permitting the grip springs to rotate the positive retention finger 30 and the opposing finger 32 to a closed position. Restoring the cartridge from the drive unit 12 to its storage cell 16 is performed in the reverse order. The interaction of the positive retention finger 30 and the opposing finger 32 of the cartridge gripper 20 with the cartridge 14 and its storage cell 16 is shown in FIGS. 4 and 5.

Figure 4:
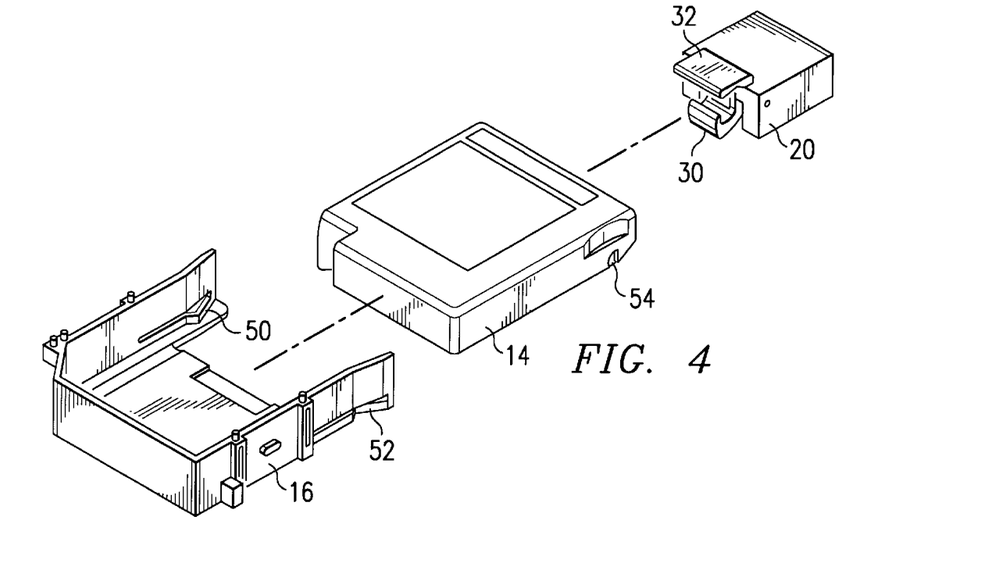
FIG. 4 is an exploded view of the gripper mechanism in association with a cartridge and storage area according to the present invention.

Referring now to FIG. 4, the interaction of the positive retention finger 30 and the opposing finger 32 of the cartridge gripper 20 with the top side of a cartridge 14 and its interaction with its storage cell 16 is shown. Only one storage cell 16 and one cartridge 14 is shown to more easily describe the interaction with the cartridge gripper 20. The cartridge 14 is held within its cell 16 by spring fingers 50 and 52. These spring fingers 50 and 52 interact with notches in the cartridge 14 with only one notch shown at 54. The spring fingers 50 and 52 positively hold the cartridge into its cell 16. These spring fingers prevent an easy withdrawal of the cartridge from its cell which could cause the cartridge 14 to drop to the floor of the library and thus prevent any further use of the library until the cartridge was retrieved. The picker mechanism 11 could be a sleeve-like casing enveloping the cartridge 14. Reference is made to U.S. Pat. Nos. 5,659,444, 5,631,785, and 5,680,377, all issued to C. H. Dang, et al and assigned to the assignee of the present invention for a more complete description of a sleeve casing cartridge picker mechanism.

Figures 5, 6:
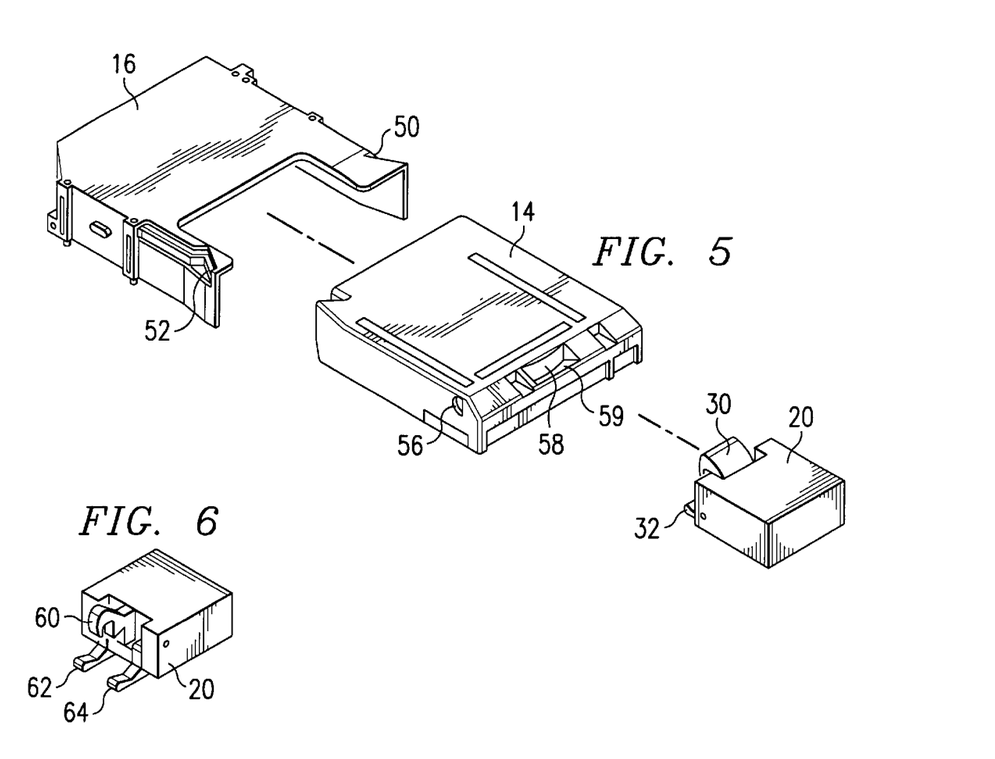
FIG. 5 is an exploded view of the underside of the storage area and cartridge showing the hooking mechanism of the gripper with respect to the present invention.
FIG. 6 is perspective view of an alternative gripper design encompassing the present invention.

In FIG. 5, the cartridge 14 is shown with a notch 56 that interacts with the spring finger 52 of the cell 16 to hold the cartridge in place. The cartridge 14 also includes a cavity 58 centrally located at the rear of the cartridge 14 with a cavity lip 59 covering the cavity 58 at the rear of the cartridge 14. The positive retention finger 30 of the cartridge gripper 20 is placed into the cavity 58 with the cavity lip 59 interacting with the positive retention finger 30 to firmly grip the cartridge 14 when the cartridge gripper is activated to grip the cartridge as previously mention for FIG. 3. The opposing finger 32 contacts the top of the cartridge as the positive retention finger 30 contacts the cavity 58 and the lip 59 on the bottom of the cartridge. With this motion, the cartridge 14 is firmly held by the cartridge gripper 20 and when the cartridge gripper 20 is activated to pull the cartridge 14 from its cell 16, the grip by the fingers 30 and 32 is such that the tension against the cartridge by the spring fingers 50 and 52 are easily overcome without dropping the cartridge. Another embodiment performing the positive retention finger 30 and the opposing finger 32 for the gripper 20 is shown in FIG. 6.

Referring now to FIG. 6, the cartridge gripper 20 includes a single positive retention finger 60 opposite two opposing fingers 62 and 64. For this embodiment, the positive retention fingers 60 acts in a similar manner to the positive retention finger 30 of FIG. 5 to interface with the cavity 58 and the lip 59 of the cartridge 14. The opposing fingers 62 and 64 contact the top side of the cartridge 14 in the same manner as described in FIG. 5 and provide a positive holding action to withdraw the cartridge from its cell 16 in a manner as described for FIG. 5.

While the invention has been particularly shown and described with reference to preferred embodiments thereof, it will be understood by those skilled in the art that various changes in form and details may be made therein without departing from the spirit and scope of the invention.

What is claimed is:

1. In a mass data storage and retrieval system including:
 a plurality of cartridges for storing data information located on media within each of said plurality of cartridges with each cartridge having a top, bottom, front, rear and two sides, a centrally located cavity adjacent to its bottom and rear side, and a lip of the cavity at the back side of the cartridge;
 a plurality of data recorder modules for receiving and reading information from and writing information to a selected cartridge for information storage;
 at least one storage module each having a plurality of cells for retaining the cartridges;
 a data directory for maintaining a directory of the information stored in the mass storage library and for generating, in response to a request, a cartridge location output signal identifying the cell containing the required cartridge within the mass storage library of information;
 an accessor, including a picker mechanism, associated with the storage module and for retrieving cartridges from its cell and for transporting cartridges between its cell and one of the plurality of data recorders for use by the one of the data recorder modules during a reading and/or writing operation and for returning the cartridge to its cell after the operation; and a gripper means mounted on said picker mechanism of said accessor for grasping the cartridge to retrieve the cartridge from its cell, for holding the cartridge during its transport to the data recording module and for retrieving the cartridge from the data recording module after the operation for transport back to the cell;

the improvement wherein the gripper means includes a positive retention finger for grasping the bottom rear face of the cartridge at the centrally located cavity and hooking against the lip of the cavity and at least one opposing finger for capturing the top of the cartridge to hold the cartridge between said positive retention finger and said opposing finger.

2. The system as in claim 1 wherein said positive retention finger is in the form of a hook with a width covering the width of the centrally located cavity.

3. The system as in claim 1 wherein said positive retention finger is in the form of a narrow hook having a width substantially narrower than the width of the centrally located cavity.

4. The system as in claim 1 wherein said opposing finger has a width substantially covering the width of the centrally located cavity.

5. The system as in claim 1 wherein said opposing finger includes at least two independent fingers each having a width substantially narrower than the width of the centrally located cavity.

6. The system as in claim 1 wherein said picker mechanism includes a solenoid to activate said gripper means.

7. The system as in claim 1 wherein said picker mechanism includes a sleeve casing bounding said cartridge to be transported.

8. A mass data storage and retrieval system comprising:
at least one host central processing unit;
a mass storage library;
a plurality of cartridges for storing data information located on media within each of said plurality of cartridges, with each cartridge having a top, bottom, front, rear and two sides, a leader block proving access to the media within the cartridge at one front corner of the cartridge, a centrally located cavity adjacent to its bottom and rear side, and a lip of the cavity at the back side of the cartridge;
a data directory for maintaining a directory of the information stored in the mass storage library and for generating, in response to a request from the host central processing unit, a cartridge location output signal identifying the cartridge location within the mass storage library;
a plurality of data recorder modules for receiving and reading information from and writing information to the tape media of the selected cartridge for information storage;
at least one storage module each having a plurality of cells for retaining the cartridges;
an accessor, including a picker mechanism, associated with the storage module and for retrieving one of the tape cartridges from its cell and for transporting cartridges between its storage module and one of the plurality of data recorders for use by the one of the data recorder modules during reading and/or writing operation and for returning the cartridge to its storage module cell after the operation;

a gripper means mounted on said picker mechanism of said accessor for grasping the cartridge to retrieve the cartridge from its cell, for holding the cartridge during its transport to the data recording module and for retrieving the cartridge from the data recording module after the operation for transport back to the cell of its storage module; and wherein the gripper means includes a positive retention finger for grasping the bottom rear face of the cartridge at the centrally located cavity and hooking against the lip of the cavity and at least one opposing finger for capturing the top of the cartridge to hold the cartridge between said positive retention finger and said opposing finger.

9. The system as in claim 8 wherein said positive retention finger is in the form of a hook with a width covering the width of the centrally located cavity.

10. The system as in claim 8 wherein said positive retention finger is in the form of a narrow hook having a width substantially narrower than the width of the centrally located cavity.

11. The system as in claim 8 wherein said opposing finger has a width substantially covering the width of the centrally located cavity.

12. The system as in claim 8 wherein said opposing finger includes at least two independent fingers each having a width substantially narrower than the width of the centrally located cavity.

13. The system as in claim 8 wherein said picker mechanism includes a solenoid to activate said gripper means.

14. The system as in claim 8 wherein said picker mechanism includes a sleeve casing bounding said cartridge to be transported.

15. A mass data storage and retrieval system comprising:
a mass storage library including a plurality of tape cartridges;
said plurality of cartridges each for storing data information located on media within each of said plurality of cartridges, with each cartridge having a top, bottom, front, rear and two sides, a leader block providing access to the media within the cartridges at one front corner of the cartridge, a centrally located cavity adjacent to its bottom and rear side, and a lip of the cavity at the back side of the cartridge;
at least one storage module each having a plurality of cells for retaining the cartridges;
a data directory for maintaining a directory of the information stored in the mass storage library and for generating, in response to a request, a cartridge location output signal identifying the cartridge location within the mass storage library;
a plurality of data recorder modules for receiving and reading information from and writing information to a selected cartridge for information storage;
an accessor, including a picker mechanism, associated with the storage module and for retrieving one of the cartridges from the cell of the storage module and transporting cartridges between its storage module for use by one of the data recorder modules during a reading and/or writing operation and for returning the cartridge to its cell after the operation;
a gripper means mounted on said picker mechanism of said accessor for grasping the cartridge to retrieve the cartridge from its cell, for holding the cartridge during its transport to the data recording module and for retrieving the cartridge from the data recording module after the operation for transport back to the cell; and wherein said gripper means includes a positive retention finger for grasping the bottom rear face of the cartridge at the centrally located cavity and hooking against the lip of the cavity and at least one opposing finger for capturing the top of the cartridge to hold the cartridge between said positive retention finger and said opposing finger.

16. The system as in claim 15 wherein said positive retention finger is in the form of a hook with a width covering the width of the centrally located cavity.

17. The system as in claim 15 wherein said positive retention finger is in the form of a narrow hook having a width substantially narrower than the width of the centrally located cavity.

18. The system as in claim 15 wherein said opposing finger has a width substantially covering the width of the centrally located cavity.

19. The system as in claim 15 wherein said opposing finger includes at least two independent fingers each having a width substantially narrower than the width of the centrally located cavity.

20. The system as in claim 15 wherein said picker mechanism includes a solenoid to activate said gripper means.

21. The system as in claim 15 wherein said picker mechanism includes a sleeve casing bounding said cartridge to be transported.

22. A mass storage library including a plurality of tape cartridges each for storing data information located on media within each of said plurality of cartridges, with each cartridge having a top, bottom, front, rear and two sides, a leader block providing access to the media within the cartridge at one front corner of the cartridge, a centrally located cavity adjacent to its bottom and rear side, and a lip of the cavity at the back side of the cartridge, said mass storage library further including at least one storage module each having a plurality of cells for retaining the cartridges, a plurality of data recorder modules for receiving and reading information from and writing information to a selected cartridge for information storage, and an accessor, including a picker mechanism and associated with the storage module for retrieving one of the cartridges from the cell of the storage module and transporting cartridges between its storage module for use by one of the data recorder modules during a reading and/or writing operation and for returning the cartridge to its cell after the operation and having a gripper means mounted on said picker mechanism of said accessor for grasping the cartridge to retrieve the cartridge from its cell, for holding the cartridge during its transport to the data recording module and for retrieving the cartridge from the data recording module after the operation for transport back to the cell, wherein said gripper means includes a positive retention finger for grasping the bottom rear face of the cartridge at the centrally located cavity and hooking against the lip of the cavity and at least one opposing finger for capturing the top of the cartridge to hold the cartridge between said positive retention finger and said opposing finger.

23. The system as in claim 22 wherein said positive retention finger is in the form of a hook with a width covering the width of the centrally located cavity.

24. The system as in claim 22 wherein said positive retention finger is in the form of a narrow hook having a width substantially narrower than the width of the centrally located cavity.

25. The system as in claim 22 wherein said opposing finger has a width substantially covering the width of the centrally located cavity.

26. The system as in claim 22 wherein said opposing finger includes at least two independent fingers each having a width substantially narrower than the width of the centrally located cavity.

27. The system as in claim 22 wherein said picker mechanism includes a solenoid to activate said gripper means.

28. The system as in claim 22 wherein said picker mechanism includes a sleeve casing bounding said cartridge to be transported.

29. A data mass storage library comprising:

a plurality of tape cartridges each for storing data information located on media within each of said plurality of cartridges, with each cartridge having a top, bottom, front, rear and two sides, a leader block providing access to the media within the cartridge at one front corner of the cartridge, a centrally located cavity adjacent to its bottom and rear side, and a lip of the cavity at the back side of the cartridge a picker mechanism for retrieving one of the tape cartridges and for transporting cartridges for use during a reading and/or writing operation and for returning the cartridge after the operation; and a gripper means mounted on said picker mechanism for grasping the cartridge to retrieve the cartridge and for holding the cartridge during its transport;

wherein the gripper means includes a positive retention finger for grasping the bottom rear face of the cartridge at the centrally located cavity and hooking against the lip of the cavity and at least one opposing finger for capturing the top of the cartridge to hold the cartridge between said positive retention finger and said opposing finger.

30. The system as in claim 29 wherein said positive retention finger is in the form of a hook with a width covering the width of the centrally located cavity.

31. The system as in claim 29 wherein said positive retention finger is in the form of a narrow hook having a width substantially narrower than the width of the centrally located cavity.

32. The system as in claim 29 wherein said opposing finger has a width substantially covering the width of the centrally located cavity.

33. The system as in claim 29 wherein said opposing finger includes at least two independent fingers each having a width substantially narrower than the width of the centrally located cavity.

34. The system as in claim 29 wherein said picker mechanism includes a solenoid to activate said gripper means.

35. The system as in claim 29 wherein said picker mechanism includes a sleeve casing bounding said cartridge to be transported.

* * * * *